United States Patent [19]

Choe

[11] Patent Number: 4,914,175

[45] Date of Patent: Apr. 3, 1990

[54] INJECTION MOLDABLE POLYIMIDES

[75] Inventor: Eui W. Choe, Randolph, N.J.

[73] Assignee: Hoechst Celanese Corp., Somerville, N.J.

[21] Appl. No.: 192,460

[22] Filed: May 10, 1988

[51] Int. Cl.$^4$ .................. C08G 69/26; C08G 8/02; C08G 14/00
[52] U.S. Cl. .................................. 528/173; 528/125; 528/126; 528/128; 528/352; 528/353
[58] Field of Search .............. 528/173, 352, 353, 125, 528/126, 128, 172

[56] References Cited

U.S. PATENT DOCUMENTS

| | | | |
|---|---|---|---|
| 4,075,171 | 2/1978 | D'Alelio | 525/353 |
| 4,255,313 | 3/1981 | Antonoplos et al. | 528/352 |
| 4,316,845 | 2/1982 | D'Alelio | 528/353 |

Primary Examiner—John Kight
Assistant Examiner—M. L. Moore
Attorney, Agent, or Firm—DePaoli & O'Brien

[57] ABSTRACT

In one embodiment this invention provides injection moldable polyimides, as exemplified by the condensation and imidization product of a aromatic dianhydride such as 2,2-bis(3,4-dicarboxyphenyl)propane dianhydride with a novel aromatic diamine such as 2,2-bis[p,p'-(m-aminophenoxy)phenylsulfonyl(p-phenyleneoxy)-phenyl]propane.

37 Claims, No Drawings

INJECTION MOLDABLE POLYIMIDES

BACKGROUND OF THE INVENTION

Polyimides are unique polymers having desirable physical and chemical properties, which include high heat resistance and exceptional strength. Polyimides can be used as wire coatings, and are suited for molding and extrusion applications.

Examples of polyimides are the condensation products of m-phenylenediamine and 2,2-bis]4-(3,4-dicarboxyphenoxy)phenyl]propane dianhydride.

A variety of polyimides are described in publications such as U.S. Pat. Nos. 3,658,938; 3,850,885; 3,983,093; 3,989,670; 3,991,004; 4,073,773; 4,281,100; 4,330,666; 4,429,102; 4,433,592; 4,433,591; 4,455,410; 4,523,006; 4,550,156; 4,565,858; 4,585,852; 4,599,396; and 4,612,361.

There is a need for polymers which have the advantages of polyimides but also have improved thermal stability and solvent resistance, and improved melt-flow characteristics and rheological behavior suitable for injection molding applications.

Accordingly, it is an object of this invention to provide thermoplastic polyimides with improved properties, and provide novel aromatic diamine monomers for the production of the polyimides.

It is another object of this invention to provide polyimides characterized by an improved combination of thermal stability, solvent resistance and melt-flow properties.

Other objects and advantages of the present invention shall become apparent from the following description and examples.

DESCRIPTION OF THE INVENTION

One or more objects of the present invention are accomplished by the provision of a aromatic diamine corresponding to the formula:

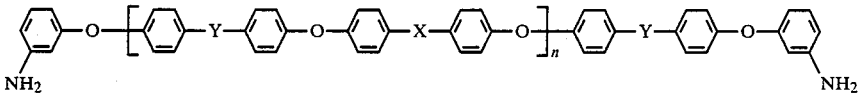

where X is a single bond, or an oxy, thio, carbonyl, sulfonyl radical, or a alkylene, haloalkylene or aralkylene radical containing between about 1-18 carbon atoms; Y is a $C_1$-$C_6$ alkylene, carbonyl or sulfonyl radical; and n is a number having an average value between about 1-5.

In another embodiment this invention provides A polyimide which is a condensation product of reactants comprising a aromatic dianhydride and a aromatic diamine corresponding to the formula:

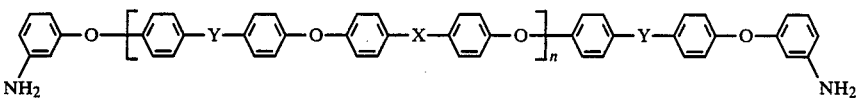

where X is a single bond, or an oxy, thio, carbonyl, sulfonyl radical, or a alkylene, haloalkylene or aralkylene radical containing between about 1-18 carbon atoms; Y is a $C_1$-$C_6$ alkylene, carbonyl or sulfonyl radical; and n is a number having an average value betweeen about 1-5; and which has a glass transition temperature in the range between about 150°-250° C., and a melt index in the range between about 5-150 at a temperature of 350° C.

In another embodiment this invention provides a polyimide which has a glass transition temperature in the range between about 150°-250° C., and a melt index in the range between about 5-150 at a temperature of 350° C., and which corresponds to the formula:

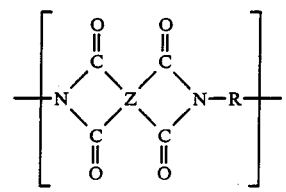

where Z is a tetravalent aromatic radical containing between about 6-20 carbon atoms, and R is a radical corresponding to the formula:

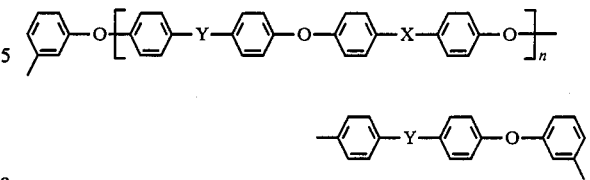

where X is a single bond, or an oxy, thio, carbonyl, sulfonyl radical, or a alkylene, haloalkylene or aralkylene radical containing between about 1-18 carbon atoms; Y is a $C_1$-$C_6$ alkylene, carbonyl or sulfonyl radical; and n is a number having an average value between about 1-5.

In a further embodiment this invention provides a polyimide which has a glass transition temperature between about 150°-250° C., a melt index between about 5-150 at 350°, and which corresponds to the formula:

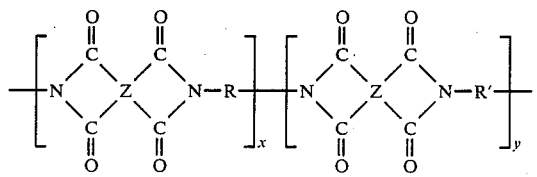

where Z is a tetravalent aromatic radical containing between about 6-20 carbon atoms, R is a radical corresponding to the formula:

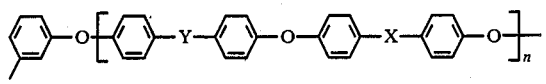

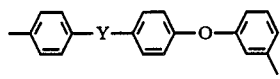

where X is a single bond, or an oxy, thio, carbonyl, sulfonyl radical, or a alkylene, haloalkylene or aralkylene radical containing between about 1-18 carbon atoms; Y is a $C_1$-$C_6$ alkylene, carbonyl or sulfonyl radical; and n is a number having an average value between about 1-5; R' is a aromatic radical containing between about 6-30 carbon atoms; and x is 1 and y is 0.1-0.6 x.

The divalent radical X in the above aromatic diamine formula is illustrated by groups which include —O—, thio, —CO—, —SO$_2$—, —CH$_2$—, —C(CH$_3$)$_2$—, —C(CF$_3$)$_2$—,

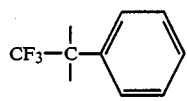

and the like.

The divalent radical Y in the above aromatic diamine formula is illustrated by groups which include —CH$_2$—, —CH$_2$—CH$_2$—, —C$_6$H$_{12}$—, —CO—, —SO$_2$—, and the like.

The tetravalent aromatic radical Z in the above polyimide formulae is illustrated by the following structures:

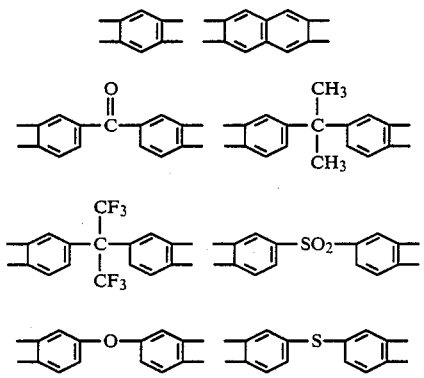

-continued

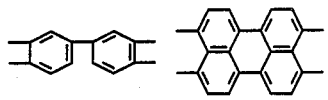

The divalent aromatic radical R' in the above polyimide formulae is illustrated by the following structures:

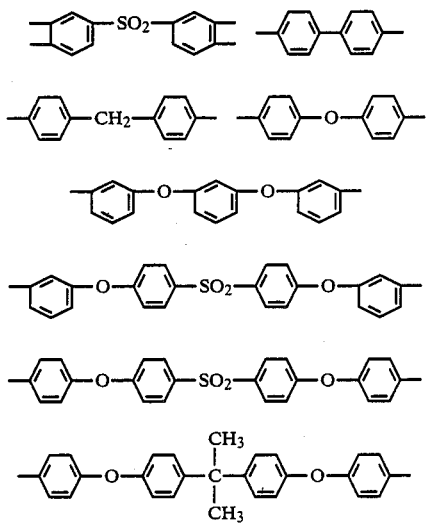

The polyimides can be produced by condensing one or more anhydrides with one or more aromatic diamines. An essential requirement is that at least one present invention aromatic diamine monomer is incorporated in the condensation reaction in a sufficient proportion to impart the desirable melt-flow properties adapted for injection molding applications.

The term "melt index" as employed herein refers to an arbitrary measure of the viscosity of a molten polymer under certain conditions. It is defined as the weight of material in grams extruded in 10 minutes through a specified orifice at a specified temperature by a loaded piston weighing 2160 grams. Melt index may be determined only on those polymers having degradation rates of less than 0.040% per minute under testing conditions.

A standardized procedure for measuring the melt index of a polymer is provided in ASTM D1238-57T.

The preparation of an invention aromatic diamine monomer is illustrated by the following reaction sequence:

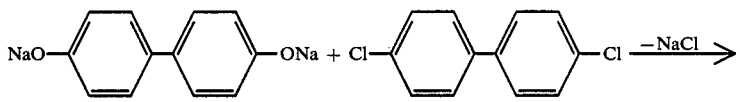

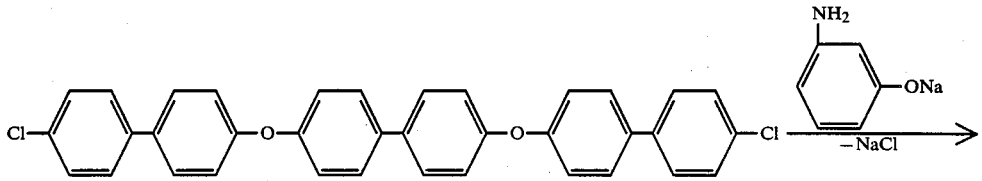 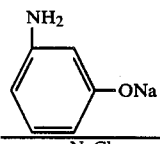

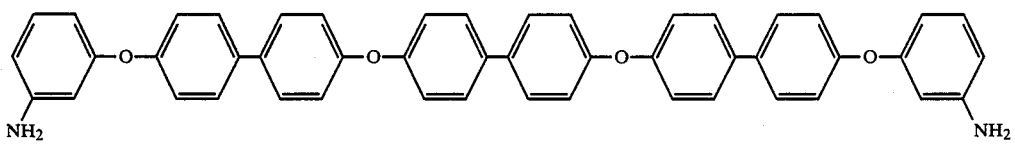

The preparation of an invention polyimide is illustrated by the following reaction sequence:

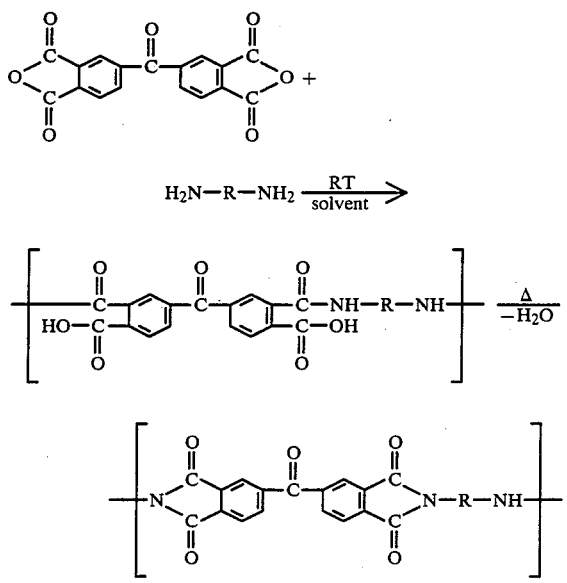

In the above formulae, the divalent radical R has the following structure:

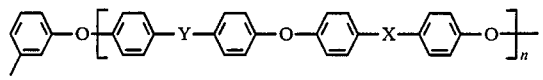

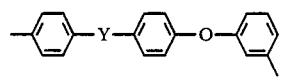

where X, Y and n are as previously defined.

The polyimides can be produced by a one step or two step or continuous process in accordance with established procedures as described publications such as the Encyclopedia of Polymer Science and Technology, Volume II, pages 247–272 (Interscience Publishers, 1969), and U.S. Pat. Nos. 4,073,733; 4,281,100; 4,443,591; 4,443,592; and 4,585,852.

In a typical procedure, the aromatic dianhydride and the aromatic diamine monomers in approximately equimolar quantitites are contacted under agitation conditions in the presence of water and an organic solvent to produce a polyamic acid intermediate. The reaction temperature is in the range of about 0°–100° C., and the reaction period will vary in the range between about 0.5–3 hours.

Suitable organic solvents for the condensation reaction include methylene chloride, chloroform, tetrachloroethane, benzene, Xylene, chlorobenzene, diethyl ether, diisobutyl ether, diphenyl ether, diglyme, tetrahydrofuran, dimethylformamide, dimethylacetamide, dimethyl sulfoxide, and the like.

The polyamic acid intermediate is recovered by stripping off the volatile components such as water and the organic solvent.

The imidization of the polyamic acid can be accomplished by heat treatment of the polyamic acid at a temperature in the range between about 180°–375° C. The polyimide product typically will have a weight average molecular weight between about 5000–100,000.

The polyimide, or its polyamic acid precursor, can be blended with up to about 50 weight percent of various fillers such as glass fibers, silica, carbon whiskers, or the like, and then converted to shaped articles by standard injection molding or compression molding techniques.

The following examples are further illustrative of the present invention. The components and specific ingredients are presented as being typical, and various modification can be derived in view of the foregoing disclosure within the scope of the invention.

EXAMPLE 1

Preparation of 2,2-bis[p,p'-(m-aminophenoxy)-phenylsulfonyl(p-phenyleneoxy)phenyl]propane

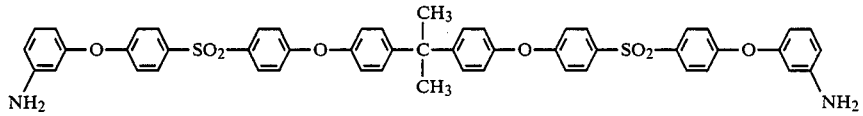

A 5 liter three-necked flask equipped with a Dean-Stark water separator, condenser, nitrogen inlet and outlet, thermometer and mechanical stirrer is charged with 273.93 grams (1.2 moles) of bisphenol A, 192 grams (2.4 moles) of 50% aqueous sodium hydroxide and 2.5 liters of toluene. The reaction mixture is heated at 100°–140° C. for three hours to remove all of the water by a toluene-water azeotrope, and then to remove an additional 1.7 liters of toluene. The resulting mixture is cooled to 60° C., and to the mixture is added 4.5 liters of methyl sulfoxide and 689.2 grams (2.4 moles) of chlorophenylsulfone. The mixture is heated to 130° C., and the reaction temperature then rises to about 150°–160° C., and is maintained at 150° C. for three hours, and then is cooled to room temperature.

Another three-necked flask equipped with a Dean-Stark water separator, condenser, nitrogen inlet and outlet, thermometer and a mechanical stirrer is charged with 261.91 grams (2.4 moles) of meta-aminophenol, 192 grams (2.4 moles) of 50% aqueous sodium hydroxide and 720 milliliters of toluene. The mixture is heated at 100°–140° C. for three hours to remove all of the water and toluene and provide sodium meta-aminophenolate.

The sodium meta-aminophenolate is added to the first reaction flask contents. The resulting reaction mixture is heated at 150° C. for three hours, and then poured into 8 liters of water containing 80 grams of sodium sulfite and 320 grams of 50% aqueous sodium hydroxide. The precipitate product is filtered, washed with water and dried at 70° in a forced air oven to provide 1023 grams (97.5% yield) of crude product. The product is dissolved in 10 liters of hot toluene, and the hot toluene solution is decanted and cooled to room temperature. After the decantation of the toluene layer, the residual solid is washed with hexane, treated three times with boiling methanol, and dried to yield a diamine product.

The diamine product has a titrated amine equivalent of 467 (theory 437); m.p. 125°–130° C. [PNMR (DMSO-d6) 7.93 (d,8H), 7.29 (d, 4H), 7.12 (m, 14H), 6.4 (m, 2H), 6.25 (m, 4H), 5.35 (s, 4H, NH2), 1.68 [s, 6H, C(CH3)].

EXAMPLE 2

Preparation of
2,2-bis[p,p'-(m-aminophenoxy)-phenylsulfonyl(p-phenyleneoxy)phenyl]propane oligomer

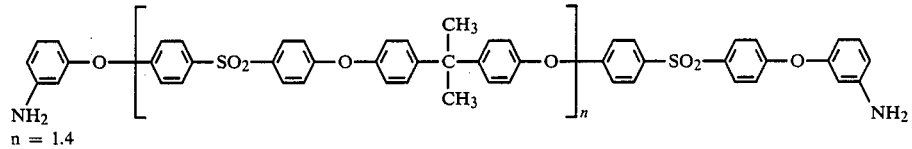
n = 1.4

Using the equipment and procedures similar to those illustrated in Example 1, 273.93 grams (1.2 moles) of bisphenol A, 261.91 grams (2.4 moles) of 3-aminophenol, 384 grams (4.8 moles) of 50% aqueous sodium hydroxide, one liter of methyl sulfoxide and one liter of toluene are charged to a reactor. The mixture is heated at 100°–140° C. for three hours and the water of reaction is removed as an azeotrope. The toluene is removed by distillation and the resulting mixture is cooled to 60° C.

To the mixture is added 1.25 liters of methyl sulfoxide and 689.2 grams (2.4 moles) of chlorophenylsulfone. The mixture is heated and maintained at a temperature of 150° C. for three hours. The product mixture is cooled and poured into 8 liters of water containing 80 grams of sodium sulfide and 320 grams of 50% aqueous sodium hydroxide. The precipitate product is filtered, washed with water, and dried at 70° C. to provide 1023 grams (97.5% yield) of crude product.

The product is dissolved in 10 liters of hot toluene, and the hot toluene solution is decanted and cooled to room temperature. After solid formation, the cooled toluene solution is decanted again, and the solid residual product is washed with hexane, and treated three times with boiling methonol to yield the diamine product.

EXAMPLE 3

Preparation of
bis[p,p'-(m-aminophenoxy)phenylsulfonyl-(p-phenyleneoxy)phenyl]thioether

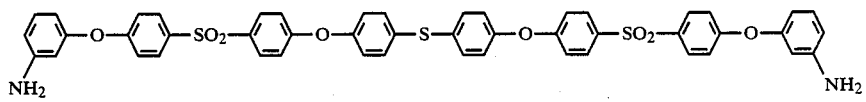

The aromatic diamine compound is prepared in accordance with the procedure of Example 1, except that 4,4'-thiodiphenol (261.92 grams, 1.2 moles) is used instead of bisphenol A.

EXAMPLE 4

Preparation of
2,2-bis[p,p'-(m-aminophenoxy)-phenylsulfonyl(p-phenyleneoxy)phenyl]-1,1,1,3,3,3-hexa-fluoropropane

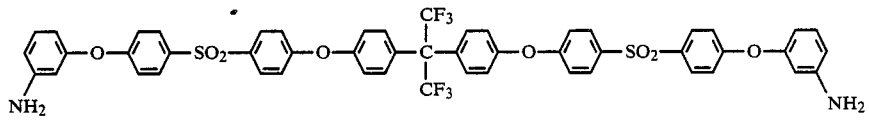

The aromatic diamine compound is prepared by the procedure of Example 1, except that 4,4'(hexafluoroisopropylidene)diphenol (403.49 grams, 1.2 moles) is used instead of bisphenol A.

EXAMPLE 5

Preparation of
2,2-bis[p,p'-(m-aminophenoxy)-phenylsulfonyl(p-phenyleneoxy)phenyl]-1,1,1-trifluoropropane

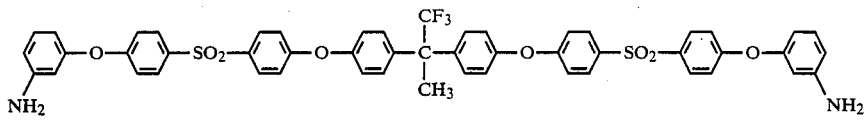

The aromatic diamine compound is prepared in accordance with the procedure of Example 1, except that 4,4'-(trifluoroisopropylidene)diphenol (338.68 grams, 1.2 moles is used instead of bisphenol A.

EXAMPLE 6

Preparation of
2,2-bis[p,p'-(m-aminophenoxy)-phenylsulfonyl(p-phenyleneoxy)phenyl]-1,1,1-trifluoro-2-phenylethane

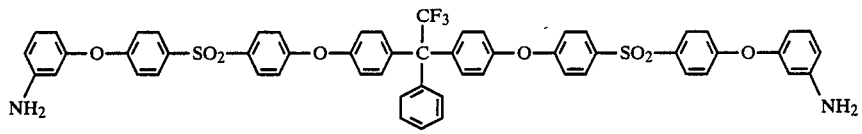

The aromatic diamine compound is prepared in accordance with the procedure of Example 1, except that 4,4'-(1,1,1-trifluoro-2-phenylethyl)diphenol (413.09 grams, 1.2 moles) is used instead of bisphenol A.

EXAMPLE 7

Preparation of
2,2-bis[p,p'-(m-aminophenoxy)-phenylsulfonyl(p-phenyleneoxy)phenyl]ether

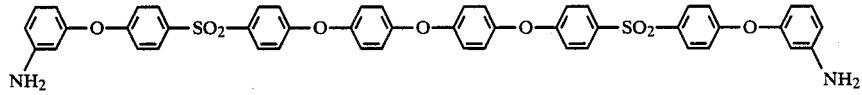

The aromatic diamine compound is prepared in accordance with the procedure of Example 1, except that 4,4'-oxydiphenol (242.75 grams, 1.2 moles) is used instead of bisphenol A.

EXAMPLE 8

Preparation of
bis[p,p'-(m-aminophenoxy)-phenylsulfonyl(p-phenyleneoxy)phenyl]methane

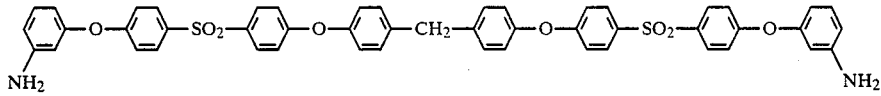

The aromatic diamine compound is prepared in accordance with the procedure of Example 1, except that 4,4'-methylenediphenol (240.35 grams, 1.2 moles) is used instead of bisphenol A.

EXAMPLE 9

Preparation of
4,4'-bis[p,p'-(m-aminophenoxy)-phenylsulfonyl(p-phenyleneoxy)]benzophenone

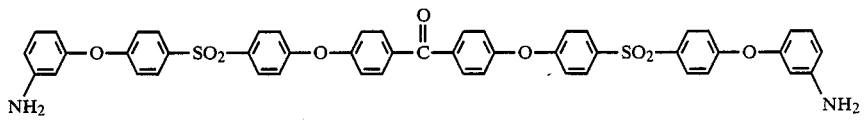

The aromatic diamine compound is prepared in accordance with the procedure of Example 1, except that 4,4'-dihydroxybenzophenone (257.15 grams, 1.2 moles) is used instead of bisphenol A.

EXAMPLE 10

Preparation of
4,4'-bis[p,p'-(m-aminophenoxy)-phenylsulfonyl(p-phenyleneoxy)]diphenylsulfone

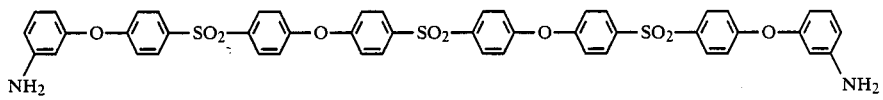

The aromatic diamine compound is prepared in accordance with the procedure of Example 1, except that 4,4'-dihydroxydiphenylsulfone (300.32 grams, 1.2 moles) is used instead of bisphenol A.

EXAMPLE 11

Preparation of
4,4'-bis[p,p'-(m-aminophenoxy)-phenylsulfonyl(p-phenyleneoxy)]biphenyl

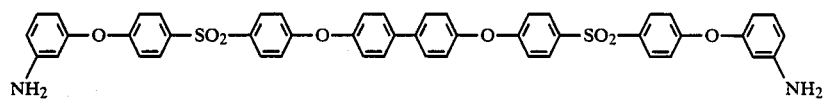

The aromatic diamine compound is prepared in accordance with the procedure of Example 1, except that 4,4'-dihydroxybiphenyl (223.55 grams, 1.2 moles) is used instead of bisphenol A.

EXAMPLE 12

Preparation of
2,2-bis[p,p'-(m-aminophenoxy)-phenylcarbonyl(p-phenyleneoxy)phenyl]propane

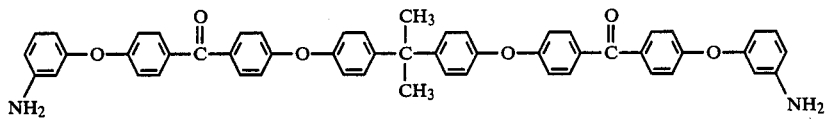

The aromatic diamine compound is prepared in accordance with the procedure of Example 1, except that 4,4'-difluorobenzophenone (523.38 grams, 2.4 moles) is used instead of chlorophenylsulfone.

EXAMPLE 13

Preparation of
2,2-bis[p,p'-(m-aminophenoxy)-phenylcarbonyl(p-phenyleneoxy)phenyl]thioether

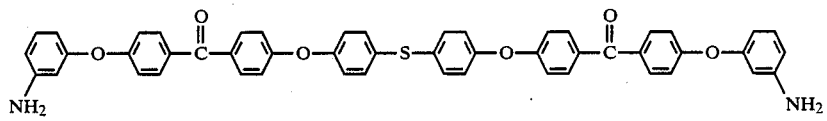

The aromatic diamine compound is prepared in accordance with the procedure of Example 3, except that 4,4'-difluorobenzophenone (523.68 grams, 2.4 moles) is used instead of chlorophenylsulfone.

EXAMPLE 14

Preparation of
2,2-bis[p,p'-(m-aminophenoxy)-phenylcarbonyl(p-phenyleneoxy)phenyl]-1,1,1,3,3,3-hexafluoropropane

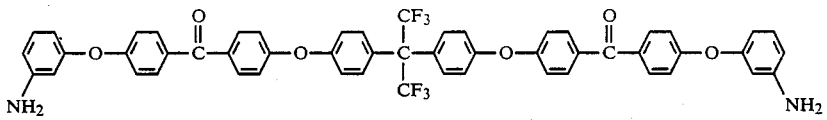

The aromatic diamine compound is prepared in accordance with the procedure of Example 4, except that 4,4'-difluorobenzophenone (523.68 grams, 2.4 moles) is used instead of chlorophenylsulfone.

EXAMPLE 15

Preparation of
2,2-bis[p,p'-(m-aminophenoxy)-phenylcarbonyl(p-phenyleneoxy)phenyl]-1,1,1-trifluoropropane

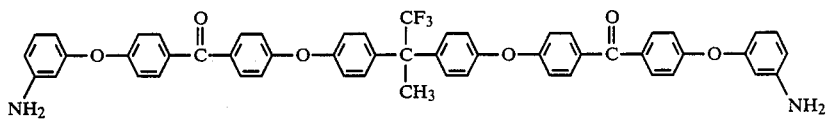

The aromatic diamine compound is prepared in accordance with the procedure of Example 5, except that 4,4'-difluorobenzophenone (523.68 grams, 2.4 moles) is used instead of chlorophenylsulfone.

EXAMPLE 16

Preparation of
2,2-bis[p,p'-(m-aminophenoxy)-phenylcarbonyl(p-phenyleneoxy)phenyl]-1,1,1-trifluoro-2-phenylethane

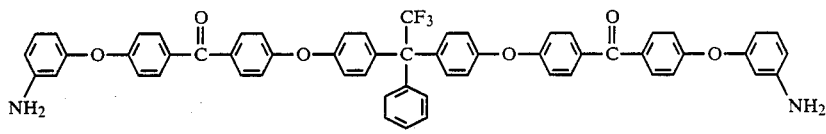

The aromatic diamine compound is prepared in accordance with the procedure of Example 6, except that 4,4'-difluorobenzophenone (523.68 grams, 2.4 moles) is used instead of chlorophenylsulfone.

EXAMPLE 17

Preparation of
2,2-bis[p,p'-(m-aminophenoxy)-phenylcarbonyl(p-phenyleneoxy)phenyl]ether

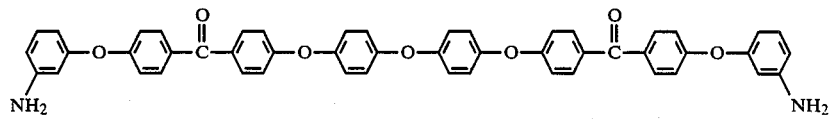

The aromatic diamine compound is prepared in accordance with the procedure of Example 7, except that 4,4'-difluorobenzophenone (523.68 grams, 2.4 moles) is used instead of chlorophenylsulfone.

EXAMPLE 18
Preparation of bis [p,p'-(m-aminophenoxy)-phenylcarbonyl(p-phenyleneoxy)phenyl]methane

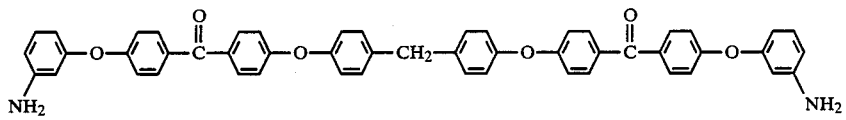

The aromatic diamine compound is prepared in accordance with the procedure of Example 8, except that 4,4'-difluorobenzophenone (523.68 grams, 2.4 moles) is used instead of chlorophenylsulfone.

EXAMPLE 19
Preparation of 4,4'-bis[p,p'-(m-aminophenoxy)-phenylcarbonyl(p-phenyleneoxy)]benzophenone

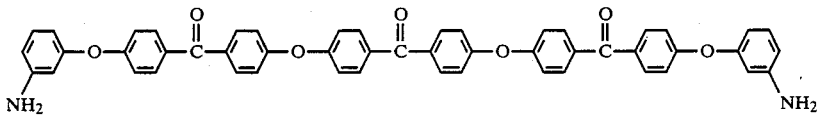

The aromatic diamine compound is prepared in accordance with the procedure of Example 9, except that 4,4'-difluorobenzophenone (523.68 grams, 2.4 moles) is used instead of chlorophenylsulfone.

EXAMPLE 20
Preparation of 4,4'-bis[p,p'-(m-aminophenoxy)-phenylcarbonyl(p-phenyleneoxy)]diphenylsulfone

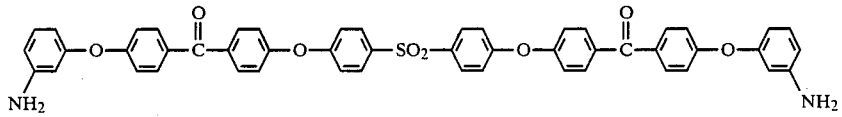

The aromatic diamine compound is prepared in accordance with the procedure of Example 10, except that 4,4'-difluorobenzophenone (523.68 grams, 2.4 moles) is used instead of chlorophenylsulfone.

EXAMPLE 21
Preparation of 4,4'-bis[p,p'-(m-aminophenoxy)-phenylcarbonyl(p-phenyleneoxy)]biphenyl

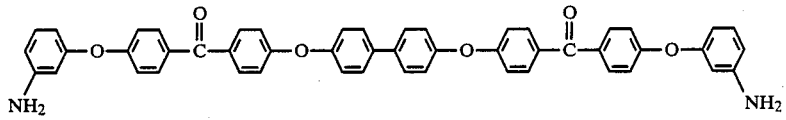

The aromatic diamine compound is prepared in accordance with the procedure of Example 11, except that 4,4'-difluorobenzophenone (523.68 grams, 2.4 moles) is used instead of chlorophenylsulfone.

EXAMPLE 22

This Example illustrates the preparation of a copolyimide employing a novel aromatic diamine in accordance with the present invention.

To a solution of 3,3'-diaminodiphenylsulfone (9.92 grams, 0.04 moles), the aromatic diamine of Example I (34.96 grams, 0.04 mole) in 258.6 grams of diglyme, is added 3,3',4,4'-benzophenone-tetracarboxylic dianhydride (BTDA). The reaction mixture is stirred at ambient temperature for two hours.

The resultant product mixture is poured into a volume of water to precipitate the poly(amic acid). The product medium is decanted to isolate the precipitated crude product. The product is stirred with water in a blender, and the slurry of finely divided solid product is filtered, and the separated solid product is washed with water, dried at 100° C., and then finally heated at 230° C. for two hours to provide a copolyimidesulfone corresponding to the following polymer structure:

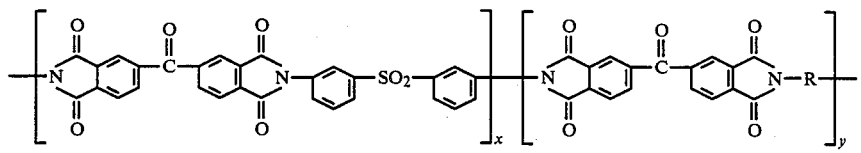

Where x:y=1:1, and R has the structure

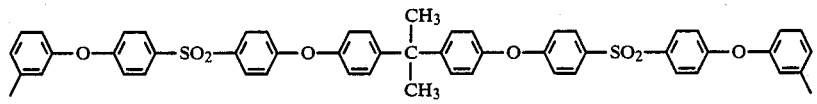

The copolyimide has a glass transition temperature ($T_g$) of 224° C., and a melt index of 24 at 300° C.

EXAMPLE 23

Following the procedure of Example 22, 2,2-(3,4-dicarboxyphenyl)hexafluoropropane dianhydride (35.52 grams, 0.08 mole) is reacted with the aromatic diamine of Example 1 and 3,3'-diaminodiphenylsulfone to produce a copolymide having the structure:

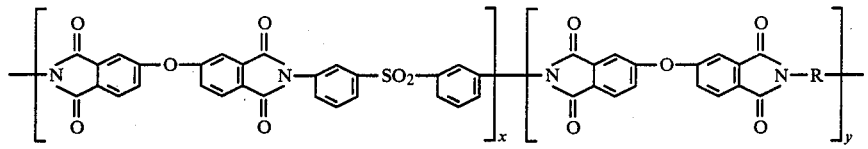

where x:y=1:1, and R has the structure represented in Example 22.

A copolyimide with similar melt characteristics as the Example 22 copolyimide is obtained when the aromatic diamine of Example 2 is the comonomer instead of that of Example 1.

EXAMPLE 24

A copolyimide is prepared by the procedure of Example 22, except that 4,4'-sulfonyldiphthalic anhydride (28.64 grams, 0.08 mole) is used as the carboxylate reactant.

The copolyimide product has the structure:

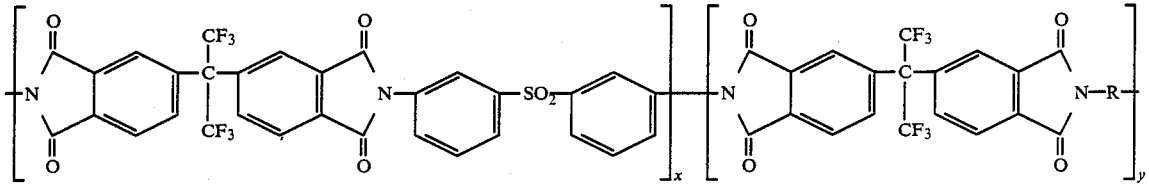

where x:y=1:1, and R has the structure represented in Example 22.

A copolyimide with similar melt characteristics as the Example 22 copolyimide is obtained when the aromatic diamine of Example 3 is the copmonomer instead of that of Example 1.

EXAMPLE 25

Employing 4,4'-oxydiphthalic anhydride (24.8 grams, 0.08 mole) as the carboxylate reactant, the procedure of Example 22 is followed to produce a copolyimide which has the structure:

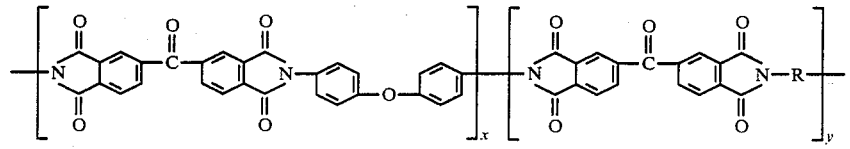

where x:y=1:1, and R has the structure represented in Example 22.

A copolyimide with similar melt characteristics as the Example 22 copolyimide is obtained when the aromatic diamine of Example 4 is the comonomer instead of that of Example 1.

EXAMPLE 26

Employing 4,4'-oxydianiline (8.0 grams, 0.04 mole) instead of 3,3'-diaminodiphenylsulfone, the procedure of Example 22 is followed to produce a copolyimide which has a galss transition temperature of 230° C., a melt index of 17 at 340° C., and has the structure:

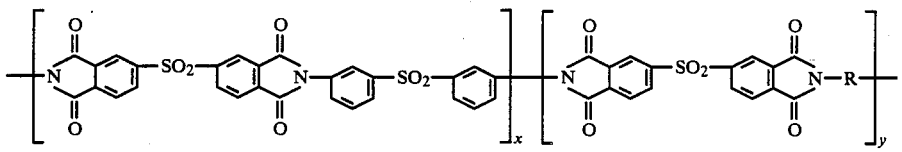

where x:y=1:1, and R has the structure represented in Example 22.

A copolyimide with similar melt characteristics is obtained when the aromatic diamine of Example 5 is the comonomer instead of that of Example 1.

EXAMPLE 27 ployed as the carboxylate reactant to produce a copolyimide product which the structure:

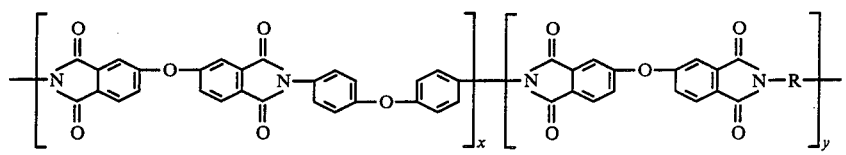

Following the procedure of Example 26, 2,2-bis(3,4-dicarboxyphenylhexafluoropropane dianhydride (35.52 grams, 0.08 mole) is employed as the carboxylate reactant to produce a copolyimide product which has the structure:

where x:y=1:1, and R has the structure represented in Example 22.

A copolyimide with similar melt characteristics as the Example 22 copolyimide is obtained when the aromatic diamine of Example 8 is the comonomer instead of that

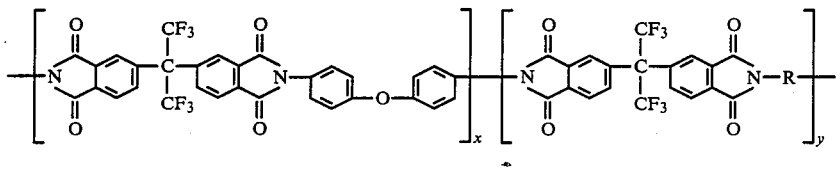

where x:y=1:1, and R has the structure represented in Example 22.

A copolyimide with similar melt characteristics as the Example 22 copolyimide is obtained when the aromatic diamine of Example 6 is the comonomer instead of that of Example 1.

EXAMPLE 28

Following the procedure of Example 26, 4,4'-sulfonyldiphthalic anhydride (28.64 grams, 0.08 mole) is employed as the carboxylate reactant to produce a copolyimide product which the structure:

of Example 1.

EXAMPLE 30

Following the procedure of Example 22, 4,4'-methylenedianiline (7.92 grams, 0.04 mole) is employed instead of 3,3'-diaminodiphenylsulfone to produce a copolyimide product which has a glass transition temperature of 196° C., a melt index of 5 at 260° C., and has the structure:

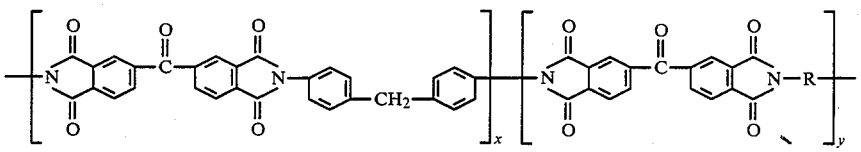

where x:y=1:1, and R has the structure represented in Example 22.

A copolyimide with similar melt characteristics is

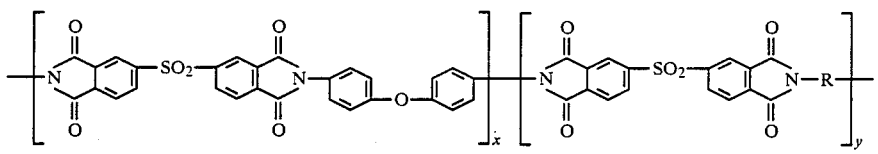

where x:y=1:1, and R has the structure represented in Example 22.

A copolyimide with similar melt characteristics as the Example 22 copolyimide is obtained when the aromatic diamine of Example 7 is the comonomer instead of that of Example 1.

EXAMPLE 29

Following the procedure of Example 26, 4,4'-oxydiphthalic anhydride (24.8 grams, 0.08 mole) is emobtained when the aromatic diamine of Example 9 is the comonomer instead of that of Example 1.

EXAMPLE 31

Following the procedure of Example 30, 2,2'-bis(3,4-dicarboxyphenyl)hexafluoropropane dianhydride (35.52 grams, 0.08 mole) is employed as the carboxylate reactant to produce a copolyimide product which the structure:

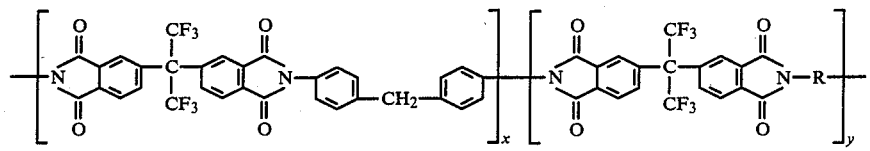

where x:y=1:1, and R has the structure represented in Example 22.

A copolyimide with similar melt characteristics as the Example 22 copolyimide is obtained when the aromatic diamine of Example 10 is the comonomer instead of that of Example 1.

EXAMPLE 32

Following the procedure of Example 30, 4,4'-sulfonyldiphthalic anhydride (28.64 grams, 0.08 mole) is employed as the carboxylate reactant to produce a copolyimide product which has the structure:

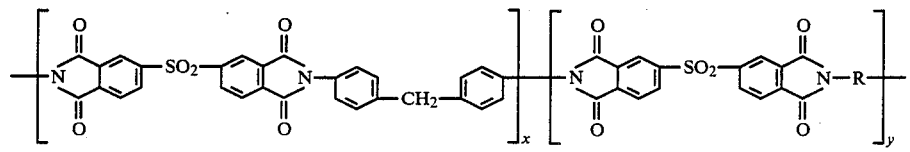

where x:y=1:1, and R has the structure represented in Example 22 Example 22 copolyimide is obtained when the aromatic diamine of Example 11 is the comonomer instead of that of Example 1.

EXAMPLE 33

Following the procedure of Example 26, 4,4'-oxydiphthalic anhydride (24.8 grams, 0.08 mole) is employed as the carboxylate reactant to produce a copolyimide product which the structure:

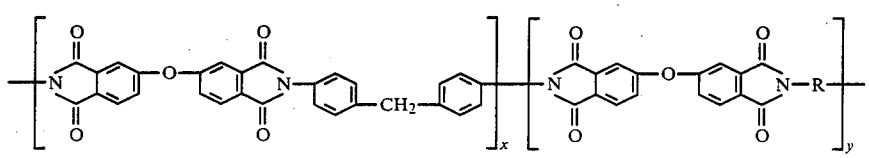

where x:y=1:1, and R has the structure represented in Example 22.

A copolyimide with similar melt characteristics as the Example 22 copolyimide is obtained when the aromatic diamine of Example 12 is the comonomer instead of that of Example 1.

EXAMPLE 34

Following the procedure of Example 23, 1,3-bis(3-aminophenoxy)benzene (11.68 grams, 0.04 mole) is employed instead of 3,3'-diaminodiphenylsulfone to produce a copolyimide product which has a galss transition temperature of 172° C., a melt index of 80 at 240° C., and has the structure:

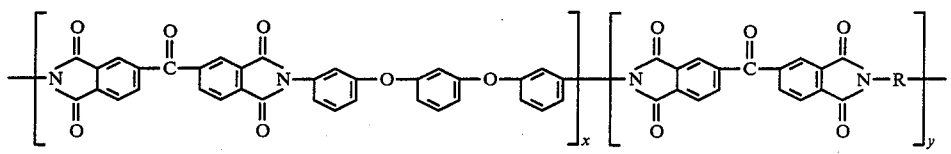

where x:y=1:1, and R has the structure represented in Example 22.

A copolyimide with similar melt characteristics is obtained when the aromatic diamine of Example 13 is the comonomer instead of that of Example 1.

EXAMPLE 35

Following the procedure of Example 34, 2,2-bis(3,4-dicarboxyphenyl)hexafluoropropane dianhydride (35.52 grams, 0.08 mole) is employed as the anhydride reactant to produce a copolyimide product which has the structure:

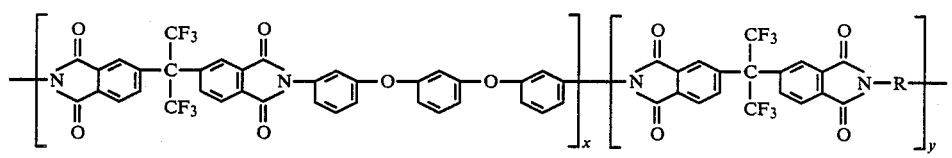

where x:y=1:1, and R has the structure represented in Example 22.

A copolyimide with similar melt characteristics as the Example 22 copolyimide is obtained when the aromatic diamine of Example 14 is the comonomer instead of that of Example 1.

EXAMPLE 36

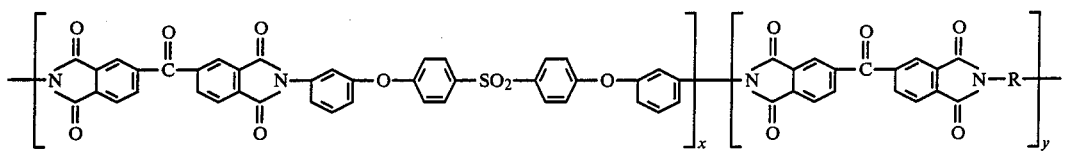

Following the procedure of Example 34, 4,4'-sulfonyldiphthalic anhydride (28.64 grams, 0.08 mole) is employed as the anhydride reactant to produce a copolyimide product which has the structure:

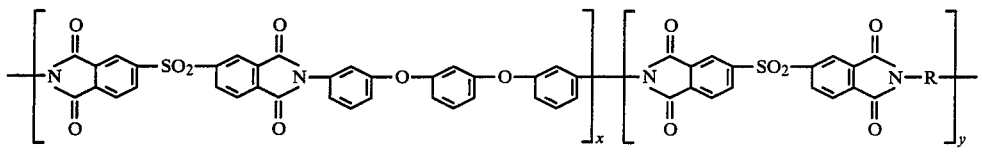

where x:y=1:1, and R has the structure represented in Example 22.

A copolyimide with similar melt characteristics as the Example 22 copolyimide is obtained when the aromatic diamine of Example 15 is the comonomer instead of that of Example 1.

EXAMPLE 37

Following the procedure of Example 34, 4,4'-oxydiphthalic anhydride (24.8 grams, 0.08 mole) is employed as the anhydride reactant to produce a copolyimide product which has the structure:

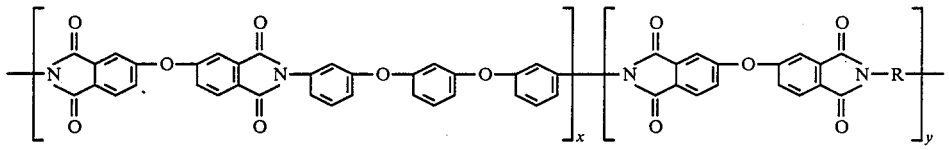

where x:y=1:1, and R has the structure represented in Example 22.

A copolyimide with similar melt characteristics as the Example 22 copolyimide is obtained when the aromatic diamine of Example 16 is the comonomer instead of that of Example 1.

EXAMPLE 38

Following the procedure of Example 22, bis-4(3-aminophenoxy)phenylsulfone (17.28 grams, 0.04 mole) is employed instead of 3,3'-diaminodiphenylsulfone to produce a copolyimide product which has a glass transition temperature of 185° C., a melt index of 57 at 230° C., and has the structure:

where x:y=1:1, and R has the structure represented in Example 22.

A copolyimide with similar melt characteristics is obtained when the aromatic diamine of Example 17 is the comonomer instead of that of Example 1.

EXAMPLE 39

Following the procedure of Example 38, 2,2-bis(3,4-dicarboxyphenyl)hexafluoropropane dianhydride (35.52 grams, 0.08 mole) is employed as the carboxylate reactant to produce a copolyimide product which has the structure:

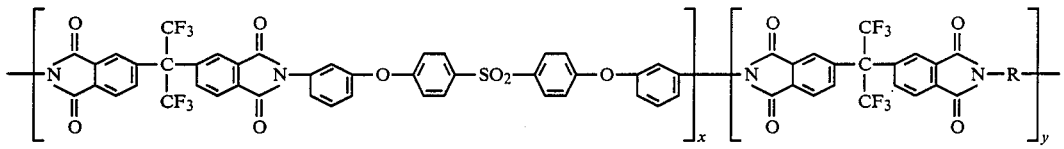

where x:y=1:1, and R has the structure represented in Example 22.

a copolyimide with similar melt characteristics as the Example 22 copolyimide is obtained when the aromatic diamine of Example 18 is the comonomer instead of that of Example 1.

EXAMPLE 40

Following the procedure of Example 38, 4,4'-sulfonyldiphthalic anhydride (28.64 grams, 0.08 mole) is employed as the carboxylate reactant to produce a copolyimide product which has the structure:

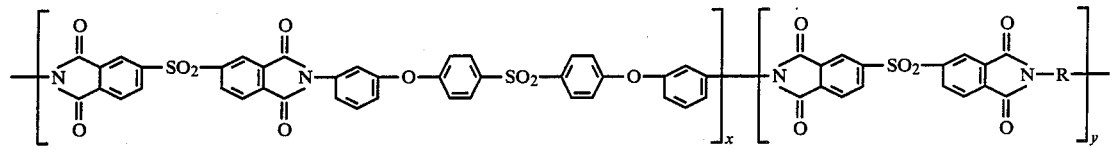

where x:y=1:1, and R has the structure represented in Example 22.

A copolyimide with similar melt characteristics as the Example 22 copolyimide is obtained when the aromatic diamine of Example 19 is the comonomer instead of that of Example 1.

EXAMPLE 41

Following the proceudre of Example 38, 4,4'-oxydiphthalic anhydride (24.8 grams, 0.08 mole) is employed as the carboxylate reactant to produce a copolyimide product which has the structure:

A copolyimide with similar melt characteristics as the Example 22 copolyimide is obtained when the aromatic diamine of Example 21 is the comonomer is the comonomer instead of that of Example 1.

EXAMPLE 43

Following the procedure of Example 42, 2,2-bis(3,4-dicarboxyphenyl)hexafluoropropane dianhydride (35.52 grams, 0.08 mole) is employed to produce a copolyimide product which has similar melt characteristics as the Example 22 copolyimide, and has the structure:

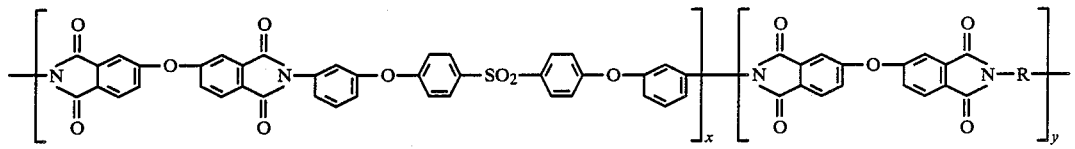

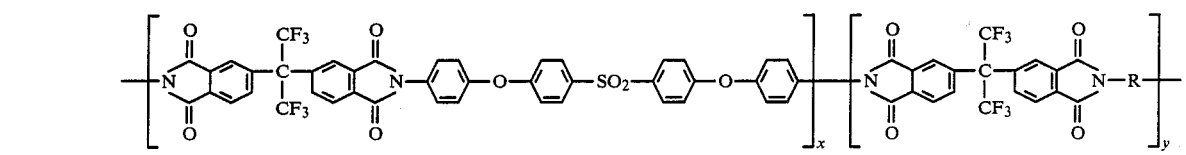

x:y=1:1, and R has the structure represented in Example 22.

a copolyimide with similar melt characteristics as the Example 22 copolyimide is obtained when the aromatic diamine of Example 20 is the comonomer instead of that of Example 1.

EXAMPLE 42

Following the procedure of Example 22, bis-4(4-aminophenoxy)phenylsulfone is employed instead of 3,3'-diaminodyphenyl sulfone to produce a copolyimide product which has the structure:

where x:y=1:1, and R has the structure represented in Example 22.

EXAMPLE 44

Following the procedure of Example 42, 4,4'-sulfonyldiphthalic anhydride (28.64 grams, 0.08 mole) is employed to produce a copolyimide product which has similar melt characteristics as the Example 22 copolyimide, and has the structure:

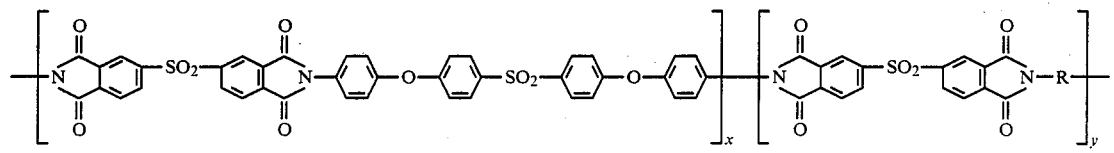

where x:y=1:1, and R has the structure represented in Example 22.

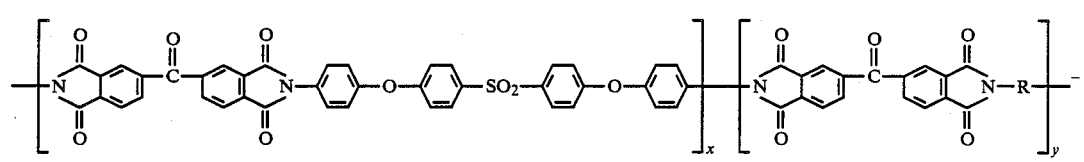

where x:y=1:1, and R has the structure represented in Example 22.

EXAMPLE 45

Following the procedure of Example 42, 4,4'-oxydiphthalic anhydride (24.8 grams, 0.08 mole) is employed to produce a copolyimide product which has similar melt characteristics as the Example 22 copolyimide, and has the structure:

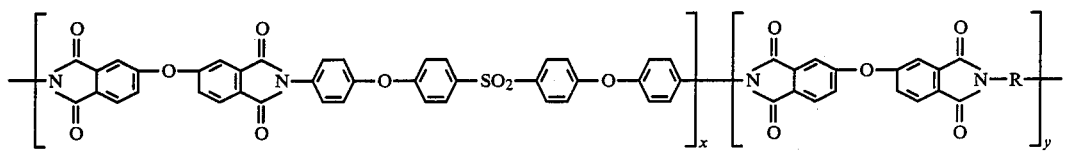

where x:y=1:1, and R has the structure represented in Example 22.

EXAMPLE 46

Following the procedure of Example 22, 2,2-bis-4[4-(aminophenoxy)phenyl]propane (16.4 grams, 0.04 mole) is employed instead of 3,3'-diaminodiphenylsulfone to produce a copolyimide product which has a glass transition temperature of 235° C., a melt index of 43 at 320° C., and has the structure:

where x:y=1:1, and R has the structure represented in Example 22.

EXAMPLE 47

Following the procedure of Example 46, 2,2-bis(3,4-dicarboxyphenyl)hexafluoropropane dianhydride (35.52 grams, 0.08 mole) is employed as the carboxylate reactant to produce a copolyimide product which has the structure:

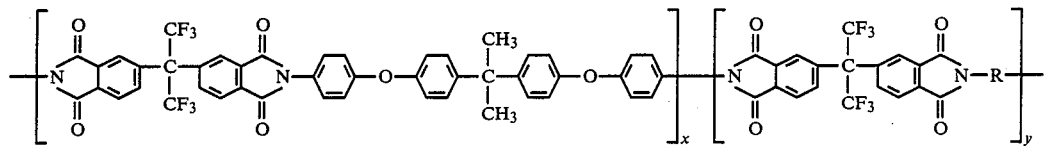

where x:y=1:1, and R has the structure represented in Example 22.

EXAMPLE 48

Following the procedure of Example 46, 4,4'-sulfonyldiphthalic anhydride (29.64 grams, 0.08 mole) is employed as the carboxylate reactant to produce a copolyimide product which has the structure:

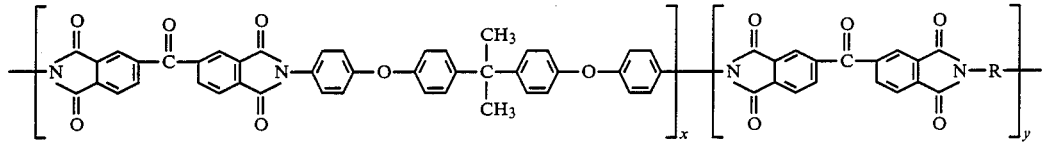

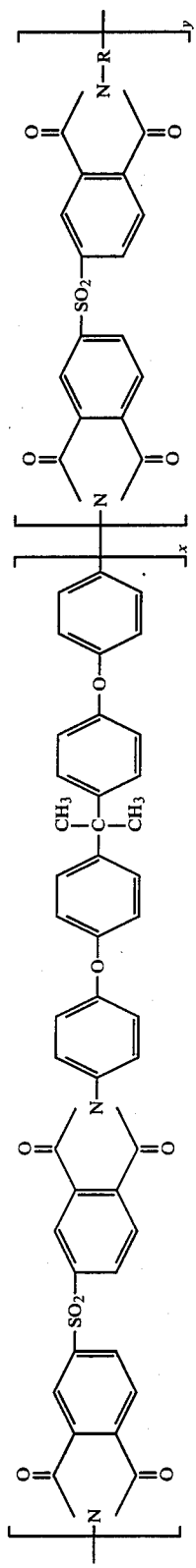

x:y=1:1, and R has the structrue represented in Example 22.

EXAMPLE 49

Following the procedure of Example 46, 4,4'-oxydiphthalic anhydride (24.8 grams, 0.08 mole) is employed as the carboxylate reactant to produce a copolyimide product which has the structure:

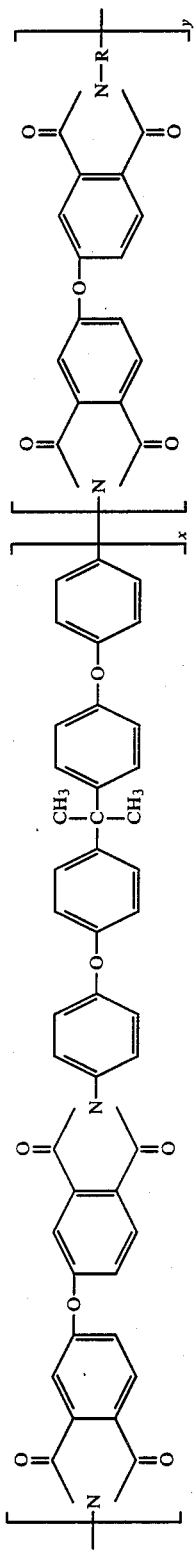

where x:y=1:1, and R has the structure represented in Example 22.

EXAMPLE 50

This Example illustrates that copolyimides produced without a present invention di(phenoxy-m-amine) monomer of the type represented in Examples 1-21 do not exhibit the melt flow characteristics or melt index essential for use in an injection molding process employing conventional injection molding equipment.

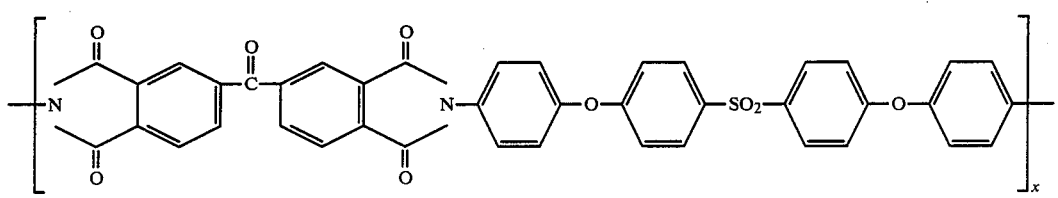
B

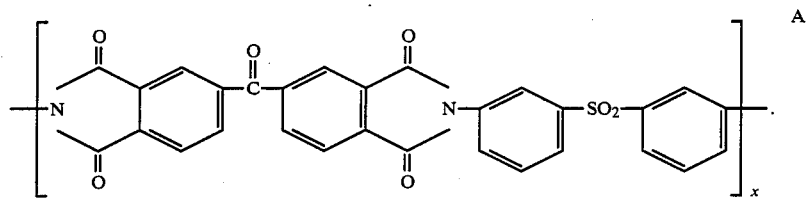
A

To a solution of 3,3'-diaminodiphenylsulfone, 19.84 grams (0.08 mole) in 258.6 grams of diglyme, is added 25.8 grams (0.08 mole) of 3,3',4,4'-benzophenonetetracarboxylic dianhydride (BTDA). The resulting mixture is stirred at ambient temperature for two hours. The product mixture is poured into water to precipitate the poly(amid acid). The aqueous diglyme solution is decanted to isolate the poly(amid acid), which then is slurried with water in a blender. The finely divided poly(amic acid) is filtered, washed three times with water, dried at 100° C., and then heated at 240° C. for two hours to form a copolyimide sulfone with the structure represented above.

The copolyimide has a glass transition temperature of 273° C., and a melt index of zero at 300° C.

Following the procedure of Example 50(A.) the copolyimide represented above is prepared by using bis-4(4-aminophenoxy)phenylsufone (34.58 grams, 0.08 mole) instead of 3,3'-diaminodiphenylsulfone.

The copolyimide has a glass transition temperature of 244° C., and a molt index of zero at 300° C.

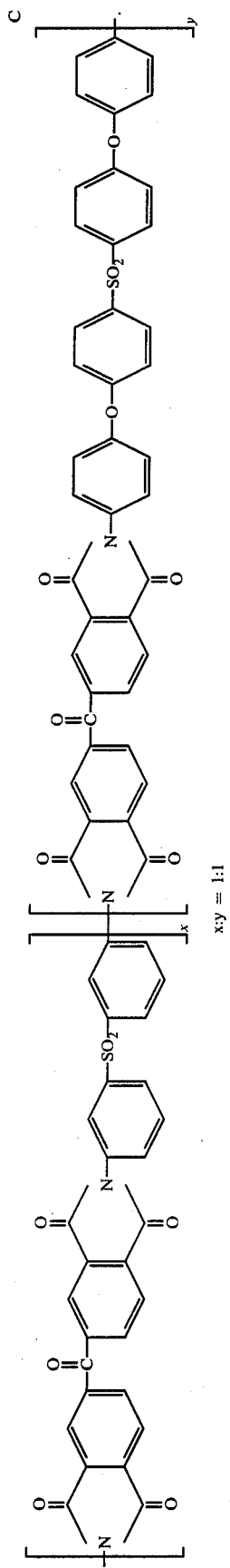

Following the procedure of Examnple 22, the copolyimide represented above is prepared by using bis-4(4-aminophenoxy)phenylsulfone (17.29 grams, 0.04 mole) instead of the Example 1 monomer.

The copolyimide has a glass transition temperature of 271° C., and a melt index of zero at 300° C.

copolyimide represented above is prepared by using bis-4(3-aminophenoxy)phenylsulfone (34.56 grams, 0.08 mole) instead of 3,3'-diaminodiphenylsulfone.

The copolyimide has a glass transition temperature of 229° C., and a melt index of zero at 300° C.

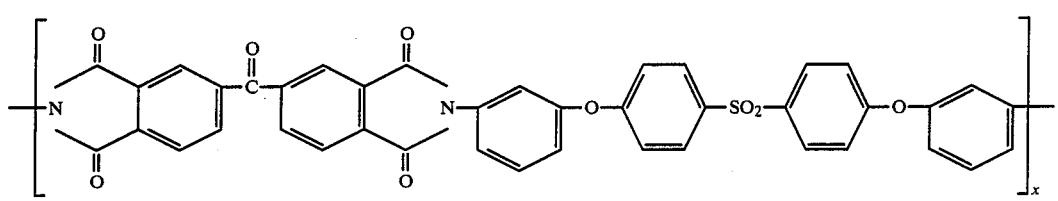

D

Following the procedure of Example 50(A.), the

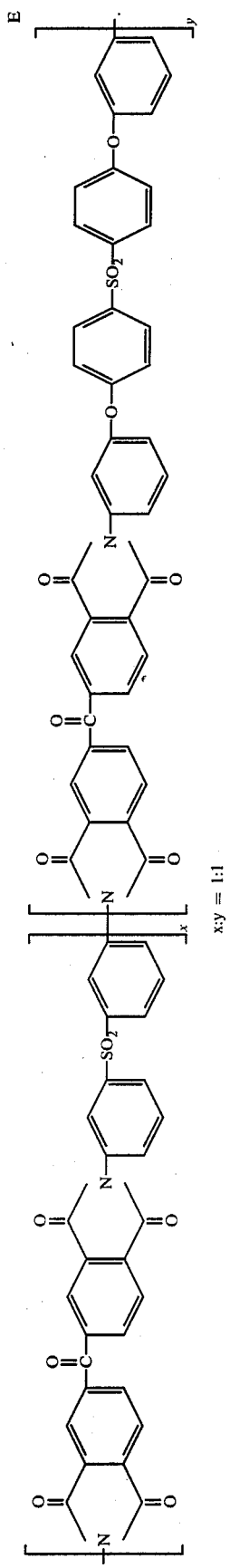

Following the procedure of Example 22, the copolyimide represented above is prepared by using bis-4(3-aminophenoxy)phenylsulfone (17.29 grams, 0.04 mole) instead of the Example 1 monomer.

The copolyimide has a glass transition temperature of 238° C., and a melt index of zero at 300° C.

copolyimide represented above is prepared by using 2,2-bis-4[4-(aminophenoxy)phenyl]propane (32.8 grams, 0.08 mole) instead of 3,3'-diaminodiphenylsulfone.

The copolyimide has a glass transition temperature of 244° C., and a melt index of zero at 300° C.

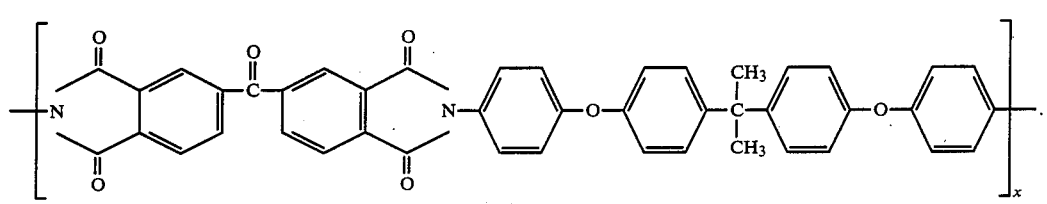

Following the procedure of Example 50(A.), the

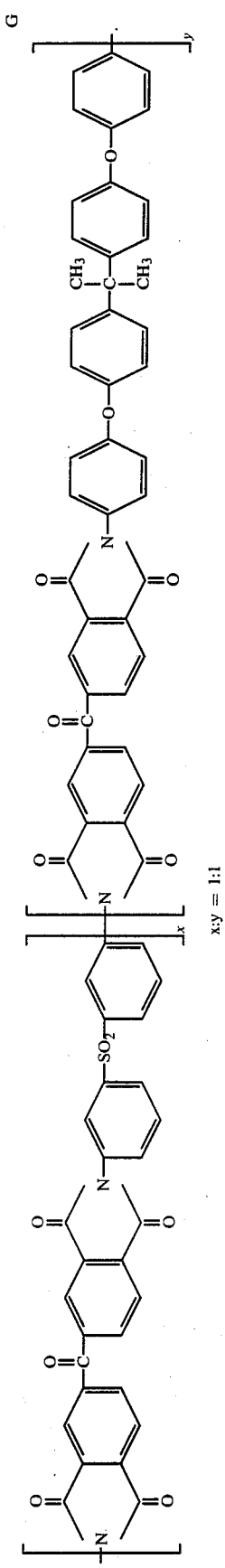

Following the procedure of Example 22, the copolyimide represented above is prepared by using 2,2-bis-4[4-(aminophenoxy)phenyl]propane (16.4 grams, 0.04 mole) instead of the Example 1 monomer.

The copolyimide has a glass transition temperature of 252° C. and a index of zero at 300° C.

copolyimide represented above is prepared by using 1,3-bis(3-aminophenoxy)benzene (23,36 grams, 0.08 mole) instead of 3,3'-diaminodiphenylsulfone.

The copolyimide has a glass transition temperature of 294° ., and a melt index of zero at 300° C.

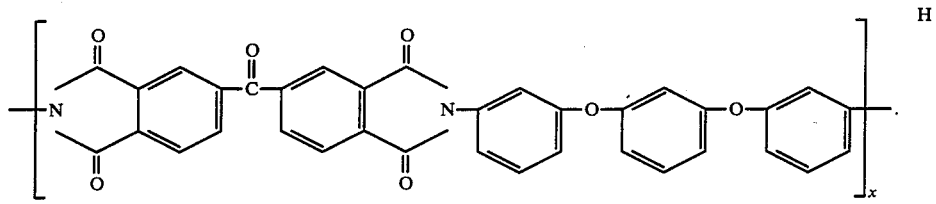

Following the procedure of Example 50(A.), the

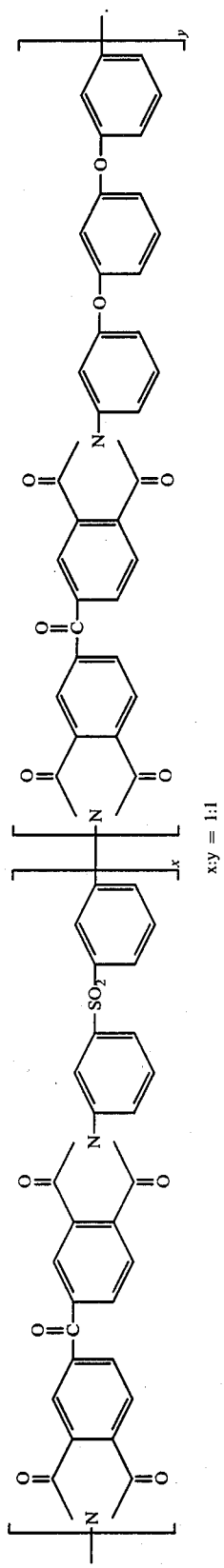

Following the procedure of Example 22, the copolyimide represented above is prepared by using 1,3-bis(3-aminophenoxy)benzene (11.68 grams, 0.04 mole) instead of 3,3'-diaminodiphenylsulfone.

The copolyimide has a glass transition tempreature of 226° C., and a melt index of zero at 300° C.

What is claimed is:

1. A polyimide which has a glass transition temperature between about 150°–250° C., a melt index between about 5–150 at 350° C., and which corresponds to the formula:

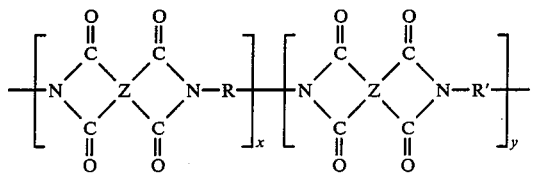

where z is a tetravalent aromatic radical containing between about 6–20 carbon atoms, R is a radical corresponding to the formula:

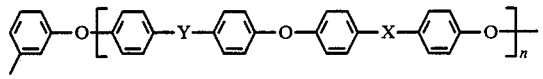

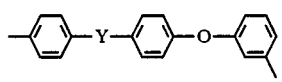

where X is a single bond, or an oxy, thio, carbonyl, sulfonyl radical, or a alkylene, haloalkylene or aralkylene radical containing between about 1–18 carbon atoms; Y is a $C_1$–$C_6$ alkylene, carbonyl or sulfonyl radical; and n is a number having an average value between about 1–5; R' is a aromatic radical containing between about 6–30 carbon atoms; and x is 1 and y is 0.1–0.6 x.

2. A polyimide in accordance with claim 1 wherein the tetravalent aromatic radical Z corresponds to a structure as represented in claim 1, respectively.

3. A polyimide in accordance with claim 1 wherein the aromatic radical R' corresponds to the structure:

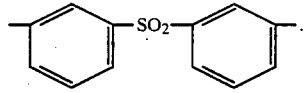

4. A polyimide in accordance with claim 1 wherein the aromatic radical R' corresponds to the structure:

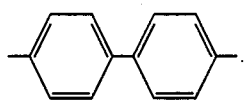

5. A polyimide in accordance with claim 1 wherein the aromatic radical R' corresponds to the structure:

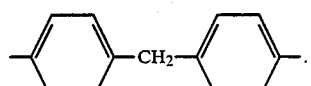

6. A polyimide in accordance with claim 1 wherein the aromatic radical R' corresponds to the structure:

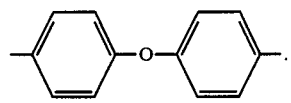

7. A polyimide in accordance with claim 1 wherein the aromatic radical R' corresponds to the structure:

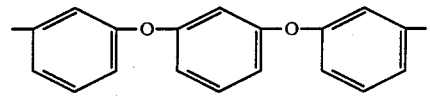

8. A polyimide in accordance with claim 1 wherein the aromatic radical R' corresponds to the structure:

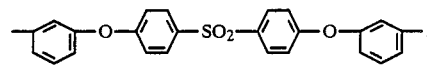

9. A polyimide in accordance with claim 1 wherein the aromatic radical R' corresponds to the structure:

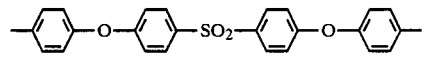

10. A polyimide in accordance with claim 1 wherein the aromatic radical R' corresponds to the structure:

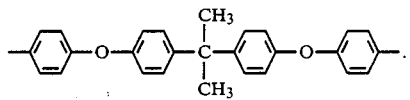

11. A polyimide which has a glass transition temperature between about 150°–250° C., a melt index between about 5–150 at 350° C., and which corresponds to the structure represented in Example 22.

12. A polyimide which has a glass transition temperature between about 150°–250° C., a melt index between about 5–150 at 350° C., and which corresponds to the structure represented in Example 23.

13. A polyimide which has a glass transition temperature between about 150°–250° C., a melt index between about 5–150 at 350° C., and which corresponds to the structure represented in Example 25.

14. A polyimide which has a glass transition temperature between about 150°–250° C., a melt index between about 5–150 at 350° C., and which corresponds to the structure represented in Example 26.

15. A polyimide which has a glass transition temperature between about 150°–250° C., a melt index between about 5–150 at 350° C., and which corresponds to the structure represented in Example 27.

16. A polyimide which has a glass transition temperature between about 150°–250° C., a melt index between about 5–150 at 350° C., and which corresponds to the structure represented in Example 28.

17. A polyimide which has a glass transition temperature between about 150°–250° C., a melt index between about 5–150 at 350° C., and which corresponds to the structure represented in Example 29.

18. A polyimide which has a glass transition temperature between about 150°–250° C., a melt index between about 5–150 at 350° C., and which corresponds to the structure represented in Example 30.

19. A polyimide which has a glass transition temperature between about 150°–250° C., a melt index between about 5–150 at 350° C., and which corresponds to the structure represented in Example 31.

20. A polyimide which has a glass transition temperature between about 150°–250° C., a melt index between about 5–150 at 350° C., and which corresponds to the structure represented in Example 32.

21. A polyimide which has a glass transition temperature between about 150°–250° C., a melt index between about 5–150 at 350° C., and which corresponds to the structure represented in Example 33.

22. A polyimide which has a glass transition temperature between about 150°–250° C., a melt index between about 5–150 at 350° C., and which corresponds to the structure represented in Example 34.

23. A polyimide which has a glass transition temperature between about 150°–250° C., a melt index between about 5–150 at 350° C., and which corresponds to the structure represented in Example 35.

24. A polyimide which has a glass transition temperature between about 150°–250° C., a melt index between about 5–150 at 350° C., and which corresponds to the structure represented in Example 36.

25. A polyimide which has a glass transition temperature between about 150°–250° C., a melt index between about 5–150 at 350° C., and which corresponds to the structure represented in Example 37.

26. A polyimide which has a glass transition temperature between about 150°–250° C., a melt index between about 5–150 at 350° C., and which corresponds to the structure represented in Example 38.

27. A polyimide which has a glass transition temperature between about 150°–250° C., a melt index between about 5–150 at 350° C., and which corresponds to the structure represented in Example 39.

28. A polyimide which has a glass transition temperature between about 150°–250° C., a melt index between about 5–150 at 350° C., and which corresponds to the structure represented in Example 40.

29. A polyimide which has a glass transition temperature between about 150°–250° C., a melt index between about 5–150 at 350° C., and which corresponds to the structure represented in Example 41.

30. A polyimide which has a glass transition temperature between about 150°–250° C., a melt index between about 5–150 at 350° C., and which corresponds to the structure represented in Example 42.

31. A polyimide which has a glass transition temperature between about 150°–250° C., a melt index between about 5–150 at 350° C., and which corresponds to the structure represented in Example 43.

32. A polyimide which has a glass transition temperature between about 150°–250° C., a melt index between about 5–150 at 350° C., and which corresponds to the structure represented in Example 44.

33. A polyimide which has a glass transition temperature between about 150°–250° C., a melt index between about 5–150 at 350° C., and which corresponds to the structure represented in Example 45.

34. A polyimide which has a glass transition temperature between about 150°–250° C., a melt index between about 5–150 at 350° C., and which corresponds to the structure represented in Example 46.

35. A polyimide which has a glass transition temperature between about 150°–250° C., a melt index between about 5–150 at 350° C., and which corresponds to the structure represented in Example 47.

36. A polyimide which has a glass transition temperature between about 150°–250° C., a melt index between about 5–150 at 350° C., and which corresponds to the structure represented in Example 48.

37. A polyimide which has a glass transition temperature between about 150°–250° C., a melt index between about 5–150 at 350° C., and which corresponds to the structure represented in Example 49.

* * * * *